United States Patent [19]

Bacardit

[11] Patent Number: 4,832,162

[45] Date of Patent: May 23, 1989

[54] VARIABLE RATE SHOCK ABSORBER

[75] Inventor: Juan S. Bacardit, Barcelona, Spain

[73] Assignee: Bendix Espana S.A., Barcelona, Spain

[21] Appl. No.: 207,689

[22] Filed: Jun. 16, 1988

[30] Foreign Application Priority Data

Jun. 19, 1987 [EP] European Pat. Off. ........ 87500039.0

[51] Int. Cl.$^4$ ................................................. F16F 9/46
[52] U.S. Cl. .................................... 188/299; 188/282;
 188/317; 188/322.14; 188/322.15; 280/707;
 280/714
[58] Field of Search ............... 188/299, 282, 281, 316,
 188/317, 318, 319, 322.15, 322.14, 322.13,
 322.22, 315, 311, 313, 314; 280/707, 714

[56] References Cited

U.S. PATENT DOCUMENTS

| 4,635,765 | 1/1987 | Schmidt | 188/299 |
| 4,682,675 | 7/1987 | Eddy, Jr. | 188/299 |
| 4,685,545 | 8/1987 | Fannin et al. | 188/299 |

Primary Examiner—Douglas C. Butler
Attorney, Agent, or Firm—Larry J. Palguta; Ken C. Decker

[57] ABSTRACT

A variable rate shock absorber having the interior of a working cylinder divided by a piston into an upper and lower working chamber. The lower working chamber is connected to a reservoir by a bi-directional valve member. A solenoid valve housed in a hollow piston rod has an actuated state connecting the upper working chamber to the reservoir. The output of the solenoid valve is connected to the reservoir by an axially disposed telescoping cylinder passing through the piston and the bi-directional valve member. Other embodiments are also disclosed.

13 Claims, 7 Drawing Sheets

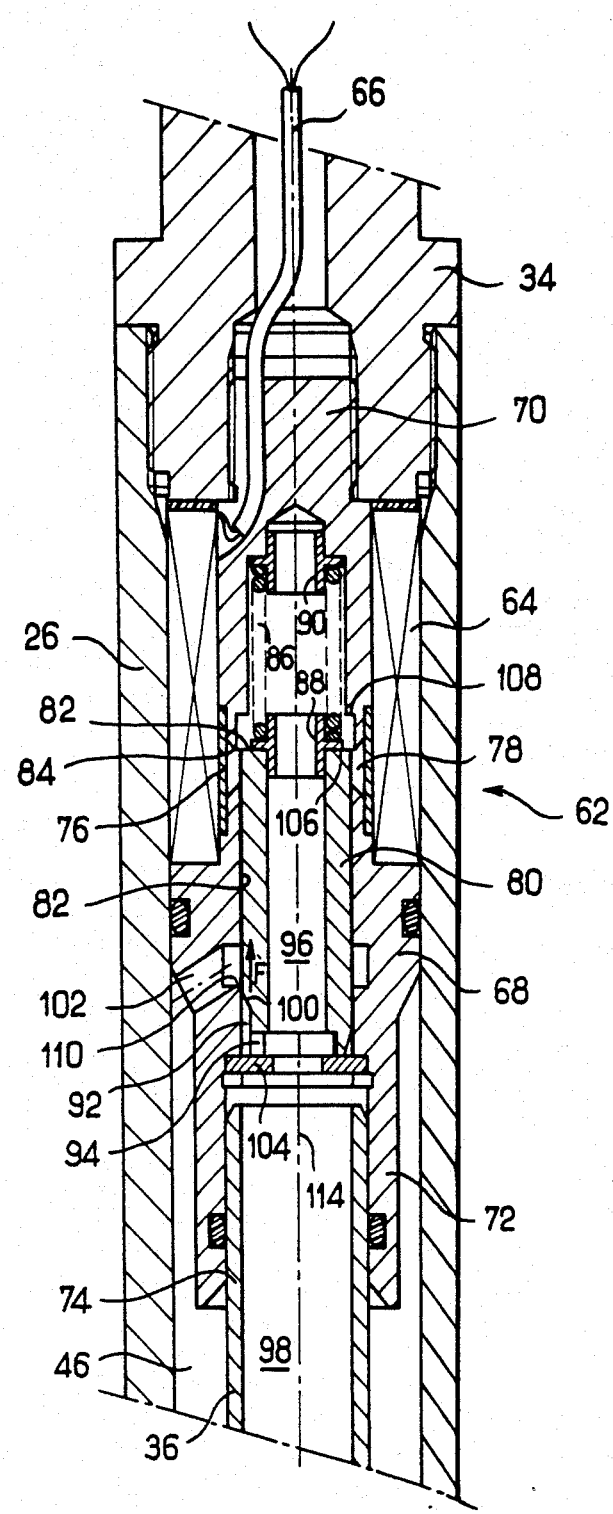
FIG_2

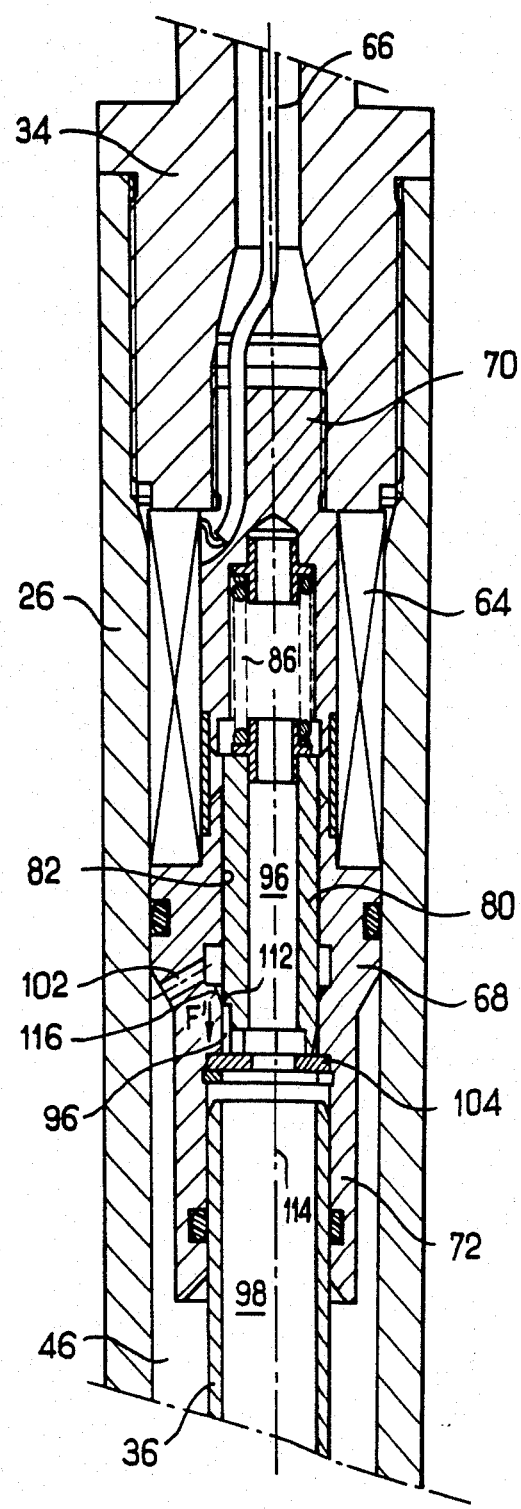
FIG_3

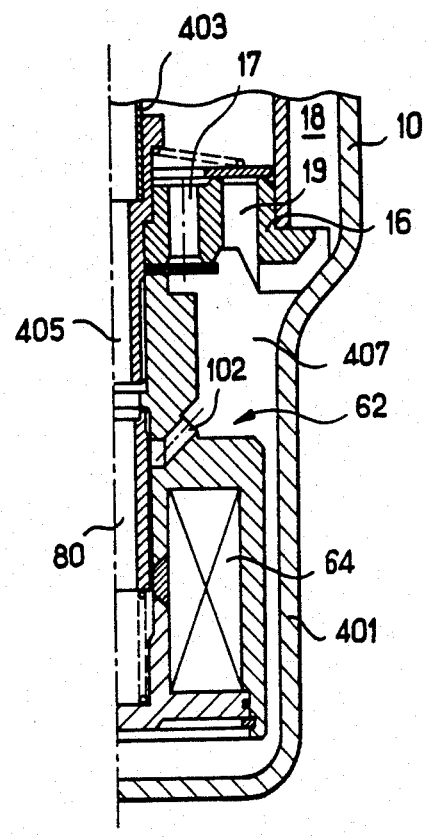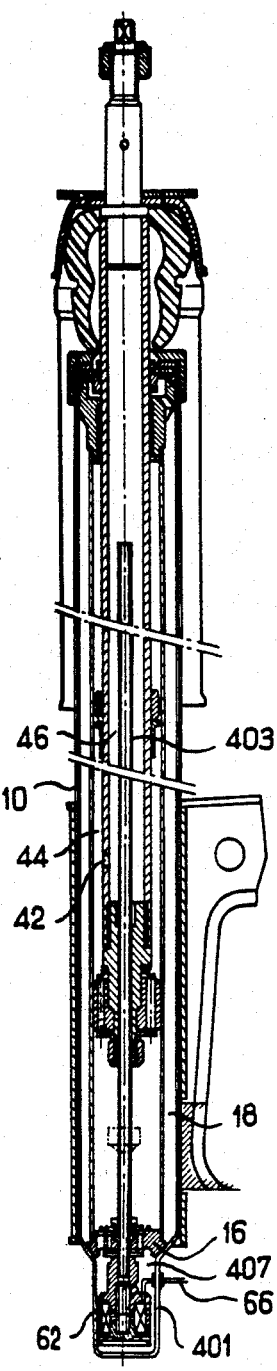
FIG. 4B
FIG. 4A

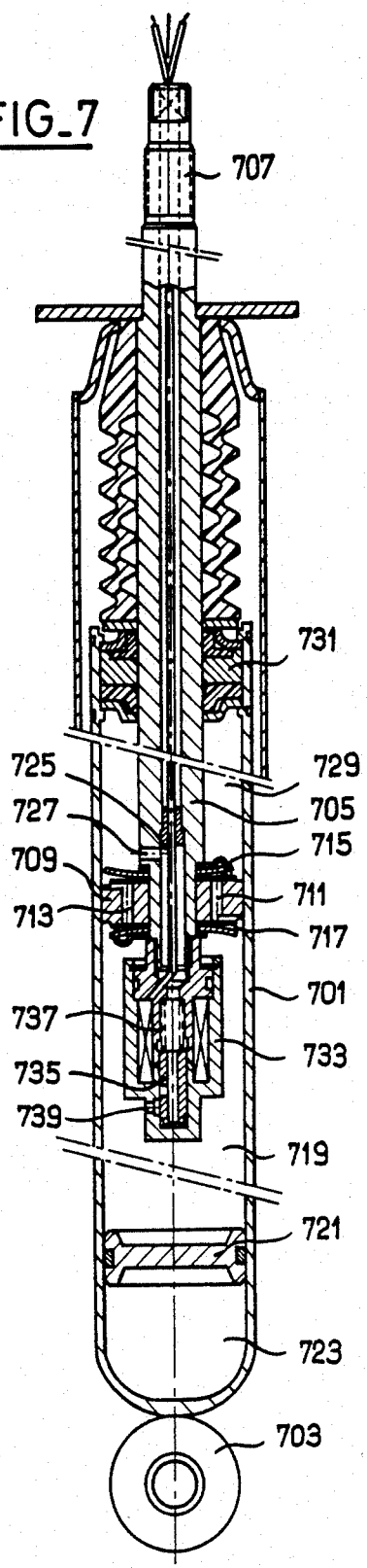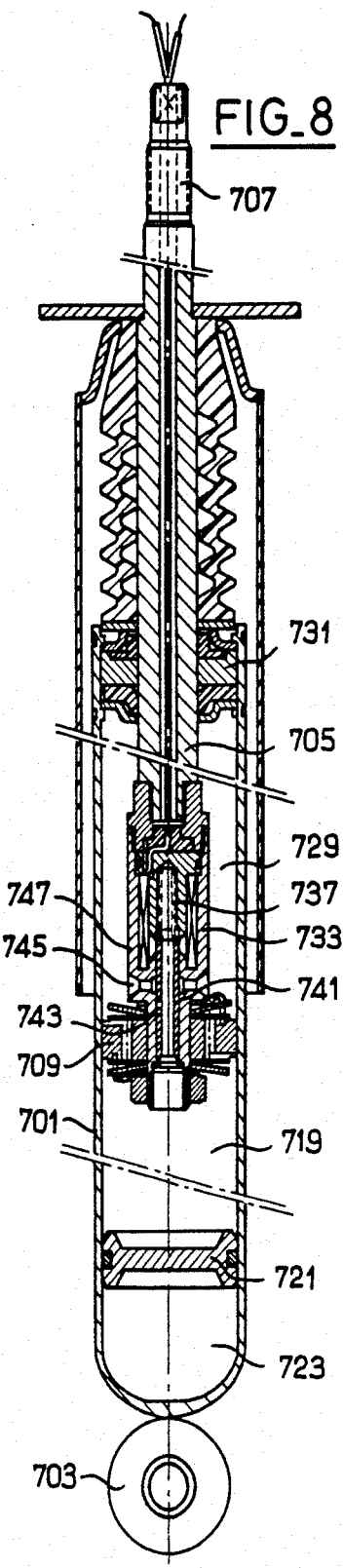

VARIABLE RATE SHOCK ABSORBER

The present invention relates to a variable rate shock absorber and, more particularly, to electrically controlled variable rate shock absorbers for automotive vehicles.

In order to deal with varying road conditions and different driving styles it is desirable to be able to change the rate of stiffness of a vehicle's shock absorbers which serve to provide hydraulic damping of the vehicle suspension. Various types of electrically controlled variable rate shock absorbers have been previously proposed. For example, U.S. Pat. No. 2,507,276 describes a hydraulic damper using a solenoid valve to increase the stiffness of the suspension during application of the vehicle's brakes in order to reduce the phenomenon of the front end of the vehicle diving during sudden braking. U.S. Pat. No. 3,039,566 discloses a hydraulic shock absorber in which a solenoid valve simultaneously vents the upper and lower working chambers of the shock absorber to a reservoir to thus selectively change the characteristics of the suspension. Similar variation of the shock absorber characteristics is provided in U.S. Pat. No. 4,463,839 which describes a shock absorber having a solenoid actuated rotary valve which is operable to open and close piston by-pass passages connecting the upper and lower working chambers of the shock absorber.

A further example of a variable rate shock absorber is given in U.S. Ser. No. 801,657 now U.S. Pat. No. 4,682,675. This device has the interior of a working chamber divided by a piston into an upper and lower working chambers. The lower chamber is connected to a reservoir by a bi-directional valve member and a solenoid valve housed in a hollow piston rod has an actuated state in which the upper working chamber is connected to low pressure reservoir. This device has the disadvantage that the solenoid valve is operable simply between an open and a closed position in response to digital-type control signals. In order to provide the desired control of the shock absorber characteristics it is necessary that, in operation, the solenoid valve oscillate at high frequency. This oscillation produces the inconvenience of undesirable noise. This noise is aggravated due to the location of the shock absorber in the wheel housing formed in the vehicle bodywork. The form of the housing makes it function as a resonating chamber which tends to amplify the noise and make it unacceptable to the vehicle driver.

It is therefore an object of the present invention to provide a variable rate shock absorber of simple construction, whose characteristics are easily controlled and in which the operational noise is minimised.

According to the invention there is provided a variable rate shock-absorber of the type having an enclosed working cylinder, an outer shell circumscribing the working cylinder and one end thereof to form a fluid reservoir, a piston member disposed in the working cylinder dividing the interior of the working cylinder into an upper and lower working chamber, valve means provided at the end of the working cylinder connecting the lower working chamber with the reservoir, and a hollow piston rod slidably received in the other end of the working cylinder, said piston rod having one end connected to the piston member and the opposite end extending external to the working cylinder, the variable rate shock-absorber further comprising a cylindrical part disposed in said working cylinder having one end in fluid communication with the reservoir and the other end slidably received in the interior of said hollow piston rod; and solenoid valve means disposed in the hollow piston rod and connected to the other end of said cylindrical part, said solenoid valve means having an inlet passage in fluid communication with said upper working chamber and an outlet in fluid communication with the reservoir through the interior of said cylindrical part, said solenoid valve means responsive to an electrical input signal to switch between a closed state inhibiting a fluid flow between said inlet passage and outlet, and an open state enabling a fluid flow between said inlet passage and outlet characterized in that the solenoid valve means comprises a valve member slideably mounted in a bore formed in a core member defined between the hollow piston rod and the upper working chamber and slideable in response to actuation of the solenoid valve to progressively open a variable orifice between a fully closed and a fully open position.

The invention will now be described by way of example with reference to the accompanying drawings, in which:

FIG. 2 is an enlarged view of that part of FIG. 1 indicated by reference arrow 2;

FIG. 3 is a view similar to FIG. 2 of an alternative construction of the shock absorber according to a second embodiment of the invention;

FIGS. 4A and 4B are longitudinal sections of a shock absorber according to a third embodiment of the invention;

FIGS. 7 and 8 are each longitudinal sections through shock absorbers of the mono-tube type according to the present invention.

Figure 1:
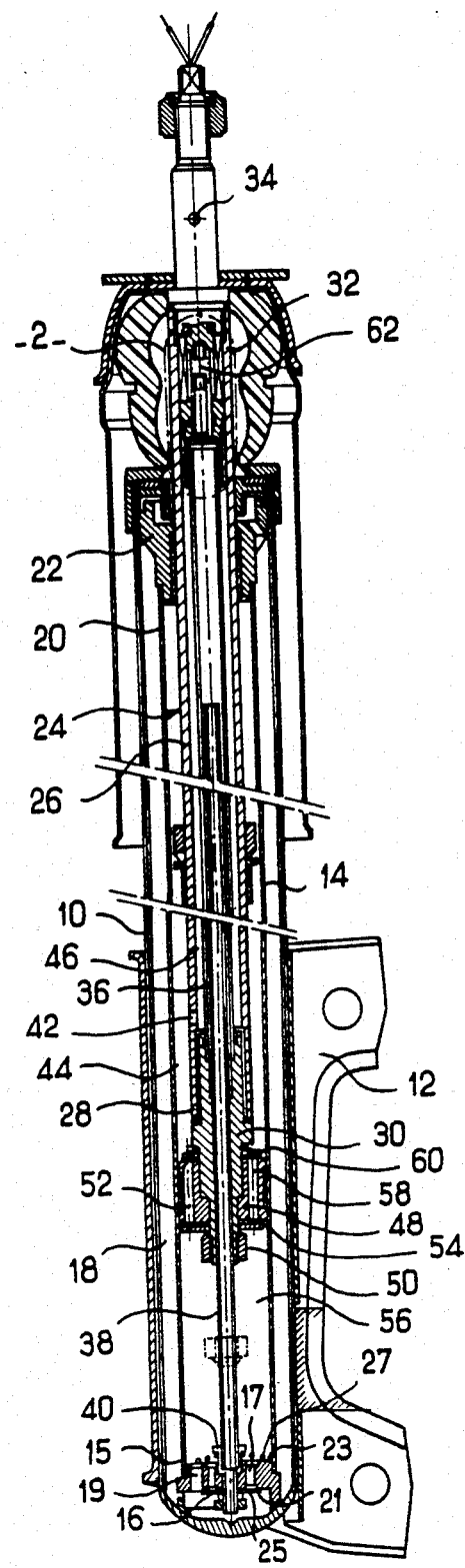
FIG. 1 is a longitudinal section of a shock absorber according to a first embodiment of the present invention.

As shown in FIG. 1, the variable rate shock absorber comprises a cylindrical outer shell 10 to which is secured a bracket 12 by means of which the shell 10 may be mounted on a support for one of a vehicle's wheels (not shown). An inner cylinder 14 is fixedly mounted inside the shell 10 and is closed at one end 15 by a two way pressure relief valve member 16 which connects the interior of the inner cylinder 14 with an annular reservoir 18 formed between the inner cylinder 14 and the outer shell 10. The other end 20 of the inner cylinder 14 is closed relative to the outer shell 10 by a closure member 22.

The shock absorber further comprises a piston rod assembly 24 which is slideably received in the closure member 22 and extends within the inner cylinder 14, coaxially therewith. The piston rod assembly 24 comprises a tubular strut 26 in one end 28 of which is fitted a mounting member 30, the other end 32 of which being closed by a mounting bolt 34 whose free end is intended to be secured to the bodywork of the vehicle (not shown). The mounting member 30 also sealingly receives an end of a cylinder 36 and further receives, slidingly, a second cylindrical part 38 one end 40 of which is fixedly mounted in the valve member 16 and passes therethrough. The cylinder 36 and the cylindrical part 38 are free to slide in telescoping fashion one relative to the other. At least one aperture 42 is provided in the tubular strut 26 adjacent the mounting member 30 to provide fluid communication between the annular volume 44 defined within the inner cylinder 14 and the annular space 46 defined between the tubular strut 26 and the cylinder 36.

The mounting member 30 supports a piston member 48 which is slideably received within the inner cylinder 14. The piston member 48 is secured on the mounting member 30 by a nut 50 and has a set of through passages 52 which are open at one end and closed at the opposite end by a spring loaded valve 54 which allows one-way fluid flow between the annular volume 44 and a working chamber 56 formed at an end of the inner cylinder 14. The piston member 48 has a second set of through passages 58 which are open to the working chamber 56 and closed at their opposite end by a second spring loaded valve 60 to provide unidirectional flow from the lower working chamber 56 to the annular volume 44.

The valve member 16, mounted under pressure between the cylinder 14 and the outer shell 10, contains several passages 17 and 19 similar to those described in the piston, and which are closed by valves 21 and 23 under the effect of springs 25 and 27 respectively. The variable rate shock absorbing characteristic of the shock absorber is defined by the permanent passages 17 and 19, the passages 52 and 58 and the stiffness of the springs 54, 60, 25 and 27. To be more precise, the shock absorbing characteristic is defined in the extension movements of the shock absorber by the permanent passages 52 and, their diameter and the resilience of the spring loaded valve 54 in the piston member 48 and the diameter of the passages 19 and the resilience of valve 23 in the valve member 16. In the compression movements of the shock absorber, the parts defining said characteristic are the permanent passages 12 and their diameter and, the resilience of the spring loaded valve 21 in the valve member 16, and the diameter of the passages 58 and the second spring loaded valve 60 in the piston member 48.

FIG. 2 shows details of a first embodiment of solenoid valve 62. As shown, the solenoid valve 62 comprises a solenoid coil 64 which is selectively connectable by an electric cable 66 to a controlling power source (not shown). The solenoid coil 64 is formed around a core member 68 one end of which is fixedly mounted on the mounting bolt 34 and the other end sealingly and slideably receives the free end 74 of cylinder 36. The core member 68 is formed from two parts of magnetic material 70 and 72 which are joined together by a ring 76 of non-magnetic material, for example bronze. An annular air gap 78 is defined between the opposing edges of the two parts 70 and 72 of the core member 68.

A cylindrical valve member 80 is slideably mounted in a longitudinal bore 82 formed in the core member 68 and has a length such that, in the illustrated rest position, an end 82 of the valve member 80 is immediately adjacent the leading edge 84 of part 70 of the core member 68. The valve member 80 is urged towards its illustrated rest position by a spring 86 which is located between two non-magnetic bushes 88 and 90. At its end remote from spring 86 the valve member 80 has a longitudinally extending groove 92 which communicates by way of passage 94 with a longitudinal bore 96 extending through the valve member 80. The bore 96 is in fluid communication with the interior 98 of cylinder 36. The closed end of groove 92 forms a chamfer 100 which, when the solenoid coil 64 is actuated and the valve member 80 moves against the force of spring 86, comes into fluid communication with a passageway 102 formed in part 72 of core member 68. Actuation of the solenoid coil 64 thus causes a fluid passageway to be opened between the interior 98 of cylinder 36 and the annular space 46.

In use the annular volume 44 and the working chamber 56 are filled with a hydraulic fluid while in the annular reservoir 18 is only partially filled with hydraulic fluid. The remaining portion of the annular reservoir 18 is filled with air or gas at a pressure above or equal to atmospheric pressure.

In operation, the piston member 48 will assume a nominal position intermediate the extremities of the inner cylinder 14. In the event that the wheel associated with the shock absorber encounters a bump, a force will be applied to the free end of the shock absorber tending to displace the outer shell 10 and inner cylinder 14 upwardly towards the mounting bolt 34 attached to vehicle's frame. This force will produce a pressure differential across the piston member 48. If the wheel associated with the shock absorber falls into a hole, the free end of the shock absorber will be subjected to a force tending to displace the outer shell 10 and the inner cylinder 14 vertically downwards, away from the mounting bolt 34 which is secured to the bodywork of the vehicle, with the shock absorber in extension. This force will cause a pressure differential across the piston member 48 and the spring loaded valve 54, causing the oil to flow through the permanent passage 52 of the piston member 48, which will allow the movement. In turn, the pressure differential across the valve member 16 will cause the oil to flow between the annular reservoir 18 and working chamber 56 which will compensate for the volume increase formed by the extension of the shock absorber.

When the wheel encounters a bump, the operation of the shock absorber is symmetrical to that indicated above, the roles of the valve member 16 and the piston member 48 being reversed.

When the wheel falls into a hole and the solenoid valve is not activated, the fluid pressure is maximum in the annular volume 44, the oil being compressed between the upper seal and the piston, rising towards the former, the shock absorber being extended.

The stiffness of the shock absorber can be changed by activating the solenoid valve 62 to vent the annular volume 44 to the reservoir 18 through the cylinder 36 and the cylindrical part 38.

Referring to FIG. 2, when the solenoid coil 64 is not activated the valve member 80 is urged by spring 86 into its rest position in abutment against a ring 104 fixedly mounted in the bore 82 of core member 68. In this position passageway 102 is closed by the valve member 80.

Activation of the solenoid coil 64 causes the valve member 80 to move against the force of spring 86 towards a position in which a shoulder 106 on an end of the valve member 80 comes into contact with an annular abutment 108 formed in the bore 82. The controlled displacement of valve member 80 opens a controlled fluid passage between the interior 98 of cylinder 36, which is in fluid communication with the interior of cylindrical part 38 and the annular space 46.

When the wheel encounters a bump and the solenoid valve is not activated, the fluid pressure is a maximum in the chamber 56 and since the diameters of the passages 17 and 19 are the stiffness of springs 25 and 27 are selected, so that the pressure drop through the valve member 16 is greater than through the piston, then the pressure in the annular volume 44 is greater than that of the reservoir 18.

Since the fluid flow through the passages 58 is proportional to the pressure differential across the piston member 48, during extension, the movement of the piston member is controlled by the pressure in the annular volume 44. Activation of the solenoid valve 62 evacuates the annular volume 44 to the reservoir 18, thereby reducing the pressure differential in the piston member 48. As a result, the fluid flow through the piston is lower, the energy dissipation by viscous friction through the piston is lower whereby the stiffness of the shock absorber in extension is reduced.

During compression, the displacement of the piston is controlled by the pressure in the chamber 56 and the pressure differential across the valve member 16. Activation of the solenoid valve 62 evacuates the annular volume 44, the pressure of which is greater, to the reservoir 18, the pressure of which is lower, thereby increasing the pressure differential across the piston. In this way the flow rate from the chamber 56 to the annular volume 44 increases and the pressure in the chamber 56 is reduced. Thereby the pressure differential across the valve member decreases, the energy disipation by viscous friction thereacross is less, which reduces the stiffness of the shock absorber in compression.

In this way the solenoid valve controlling the fluid flow rate from the annular volume 44 to the reservoir 18 may be used to reduce the stiffness of the shock absorber in the desired degree when the valve is open, both in the extension and in the compression movements.

During the rebound or when the wheel falls into a hole, a force is generated tending to displace the housing and inner cylinder downwardly away from mounting bolt 34. This force increases the fluid pressure in the annular volume 44 above the piston member 48. When the solenoid valve 62 is actuated, the annular volume 44 is vented to the reservoir 18. Therefore, the movement of the piston member 48 is controlled primarily by the fluid flow trough relief valve 16 from the reservoir 18 to the working chamber 56. The size of the fluid passages of the relief valve 16 which control the rate of fluid flow from the reservoir 18 to the working chamber 56 can be selected to decrease the stiffness of the shock absorber by the desired amount when the solenoid valve is open.

In FIG. 3 there is shown a second embodiment of solenoid valve 62 in which the shape of the valve member 80 has been modified with respect to that of the FIG. 2 embodiment. Whereas, in the FIG. 2 embodiment, the longitudinally extending groove 96 has a chamfered end 100 which cooperates with a right-angled corner 110 of the passageway 102, in the embodiment of FIG. 3 the configuration is reversed. As shown in FIG. 3 the longitudinally extending groove 96 has an end 112 extending at right angles to the axis 114 of the valve member 80. In the illustrated rest position the end 112 lies adjacent an edge of a chamfered surface 116 which leads to the passageway 102.

The relative advantages of the two embodiments of valve member 80 will now be considered. In the embodiment of FIG. 2 the differential pressure caused by the flow past the chamfered end 100 included a component F acting parallel to the axis 114 against the force of spring 86. This force F tends to give a throttling effect which depends on the pressure drop and the current flowing in the solenoid coil 64. This feature allows a correction the throttling value depending on the fluid flow rate past the chamfered end 100 which is, in turn, proportional to the shock absorber movement.

In the embodiment of FIG. 3 the chamfered surface 116 lies on the core member 68 which has the result that a force F' similar in magnitude to F is exerted on the fixed core member 68. In this embodiment the force F' has virtually no influence on the throttling value.

Various alternative embodiments of the present invention will now be considered. In the following description those components which are common to the embodiment of FIGS. 1 to 3 will be given the same reference numerals.

FIGS. 4a and 4b show a variant of the present invention in which the internal structure of the shock absorber has been simplified with respect to that shown in FIG. 1. The solenoid valve 62 is located in an extension 401 of the outer shell 10 as opposed to in the tubular strut 26 in the previous embodiment. The shock absorber comprises a single inner tube 403 which corresponds to the second cylindrical part 38 of the embodiment of FIG. 1 in which two telescoping tubes were necessary due to the location of the solenoid valve.

The inner tube 403 is received in a sleeve 405 which is fixed in, and passes through the valve member 16. The interior of the inner tube 403 communicates with the interior of the sliding valve member 80 of the solenoid valve 62. As in the case of the previous embodiment, when the solenoid coil 64 is actuated, valve member 80 moves against spring 86 and progressively opens passageway 102 between the interior of the inner tube 403 and a chamber 407 which is defined by the extension 401 of the outer shell 10. The chamber 407 is in permanent communication with the annular reservoir 18 and may communicate with the working chamber, as in the case of the previous embodiment, by way of passages 17 and 19. The interior of the inner tube 403 is in fluid communication with the annular space 46 which is, itself, in fluid communication with the annular volume 44 by way of aperture 42.

The operation of this embodiment of the present invention is analogous to that of the embodiment of FIG. 1.

Figure 5:
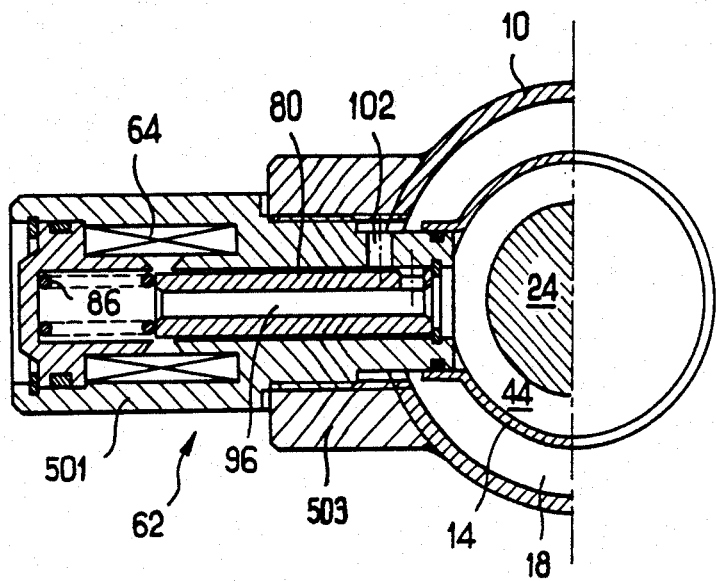
FIG. 5 is a lateral partial section through a further embodiment of shock absorber.

In the embodiment shown in FIG. 5 the solenoid valve 62 is located on the outside of the shock absorber as opposed to in the interior as in the case of the previous embodiments. The solenoid valve 62 comprises a cylindrical body 501 which is fitted, by means of a screw thread, into a boss 503 which is formed on the outer surface of the outer shell 10 generally midway between the ends of the shock absorber. The interior of the sliding valve member 80 is in fluid communication with the annular volume 44. A passageway 505 in the body 501 communicates with the annular reservoir 18 whereby selective operation of the solenoid coil 104 causes the valve member 80 to progressively open a fluid passage between the annular reservoir 18 and the annular volume 44. The operation of this embodiment of the present invention is thus analogous to that of the embodiment of FIG. 1.

Figure 6A:
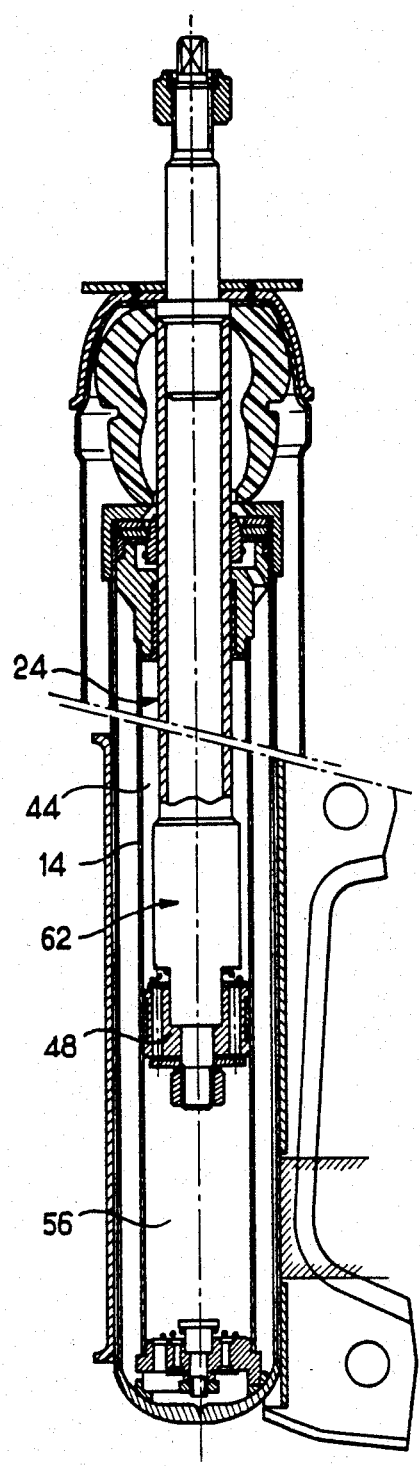
FIGS. 6A and 6B are longitudinal sections through another embodiment of shock absorber.
Figure 6B:
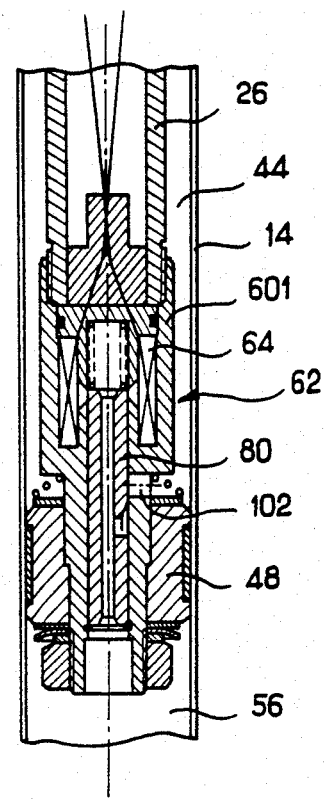

The embodiment shown in FIGS. 6A and 6B concerns a further, alternative location of the solenoid valve 62 which, in this case, is mounted on the piston rod assembly 24. The solenoid valve 62 comprises a cylindrical body 601 which is mounted by means of a screw thread on the free end of the tubular strut 26. The interior of the sliding valve member 80 communicates with the working chamber 56 which is defined below the piston member 48. As previously described the solenoid valve 62 may be selectively actuated to progressively open passage 102 and allow fluid communication between working chamber 56 and the annular volume 44. In this embodiment the arrangement of telescoping tubes (36,38) is not required.

The previously described embodiments of the present invention relate to a shock-absorber of the bi-tube type. However, it is also envisaged that the present invention may be used with a shock absorber of the mono-tube type as will be described with reference to FIGS. 7 and 8.

The mono-tube shock absorber is of a simplified construction as compared to that of the bi-tube type and comprises a single outer tube 701 to the closed end of which is fixed a mounting eye 703 by means of which the tube may be attached to the wheel support of a vehicle (not shown). A piston rod assembly 705 has a mounting bolt 707 formed at one end by means of which the piston rod assembly 705 is intended to be secured to the bodywork of the vehicle (not shown). The free end of the piston rod assembly 705 carries a piston member 709 which has sets of through passages 711 and 713 formed therein, each of which is closed by a respective spring located valve member 715 and 717 in a similar way to the piston member of the previous embodiments.

The piston member 709 defines one end wall of a working chamber 719 formed in the tube, the other end wall of which is defined by a seal member 721 mounted in the tube. The chamber 723 which is defined between the seal member 721 and the closed end of the tube 701 is filled with gas at a pressure above atmospheric in a conventional way. The piston rod assembly 705 has a longitudinal axial passage 725 therein which communicates, by openings 727, with an annular space 729 formed in the tube 701 between the piston member 709 and a closure member 731. A solenoid valve 733 is similar in construction to that of the previous embodiments and includes a tubular sliding valve member 735 the interior of which is in fluid communication with passage 725 in the piston rod 705. Selective actuation of the solenoid valve 733 causes the valve member 735 to move against spring 757 and progressively open a passage 739 between the working chamber 719 and the passage 725 of the piston rod 705. Thus, actuation of the solenoid valve 733 progressively opens or closes a passage between the working chamber 719 and the annular space 729 in parallel with the passages 711, 713 through the piston member 709.

The embodiment of the present invention shown in FIG. 8 is closely similar to that of FIG. 7 except that the solenoid valve 733 is located between the piston rod 705 and the piston member 709 and effectively forms a continuation of the piston rod 705. The valve member 741 of the solenoid valve 733 differs from that of FIG. 7 in that it includes lateral openings 743 which are selectively brought into communication with openings 745 in the valve body 747 to allow fluid communication between the working chamber 719 and the annular space 729. The operation of this embodiment is thus analoguous to that of FIG. 7.

In each of these two embodiments, the working chamber 719 or the annular space 729 may constitute the annular reservoir of the embodiments of the previous figures, depending on whether the shock absorber is in compression or extension.

Figure 9:
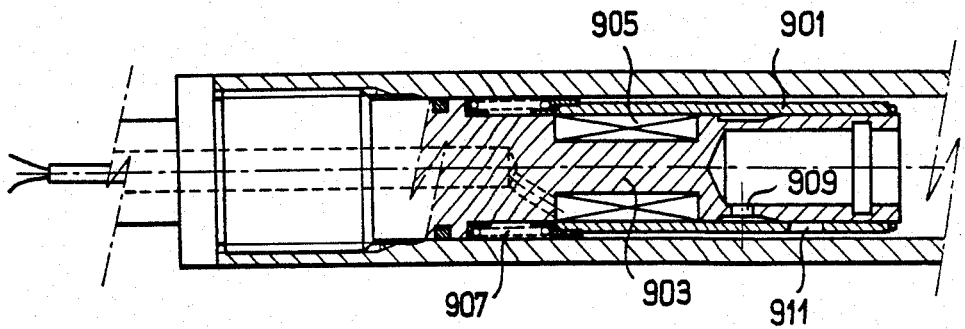
FIG. 9 is a longitudinal section through a further embodiment of solenoid valve.

FIG. 9 shows a further embodiment of solenoid valve which may be adapted for use with any of the previously described shock absorbers. In this embodiment of solenoid valve the sliding valve member 901 comprises a sleeve located around an inner valve body 903. Selective actuation of the solenoid coil 905 causes the valve member 901 to move against the force of spring 907 and progressively bring openings 909 and 911 into register so as to allow fluid passage through the valve.

The various type of solenoid valve which have been described herein are adaptable to be used, with minor modifications in some cases, with the various types of previously described shock absorbers. In each case, the present invention allows an additional flowpath to be selectively opened in a controlled manner between the principal chambers of a shock absorber in a way that gives a desired modification of the shock absorber characteristics with minimum operation noise.

I claim:

1. A variable rate shock absorber comprising a tubular working cylinder (14,701) destined to be mounted on a suspended part of a vehicle, a piston rod assembly (24,705) slideably received in an outer shell and having one end (34,707) destined to be mounted on a fixed part of a vehicle, the piston rod assembly having at a free end a piston member (48; 709) cooperating with the working cylinder (14; 701) to divide the interior thereof into an upper (44; 729) and a lower working chamber (56,719), valve means in the piston member (48,709) to permit controlled two-way flow between the upper (44; 729) and lower (56; 719) working chambers, and solenoid valve means (62; 733) disposed between the upper working chamber and a reservoir (18; 719) and selectively actuatable to allow fluid flow therebetween, characterized in that the solenoid valve means (62; 733) comprises a valve member slideably mounted with respect to a core member and slideable in response to actuation of the solenoid valve to progressively open a variable orifice (102; 911) between a fully closed and a fully open position.

2. A shock absorber as claimed in claim 1, characterized in that the reservoir (719) is constituted by the lower working chamber (719).

3. A shock absorber as claimed in claim 2, characterized in that the solenoid valve means (733) is located in the piston rod assembly (705) between the one end (707) and the piston member (709).

4. A shock absorber as claimed in claim 2, characterized in that the solenoid valve means (733) forms an extension of the piston rod assembly (705) and extends, on a side of the piston member (709) opposite the one end (707), into the lower working chamber (719).

5. A shock absorber as claimed in claim 1, characterized in that the absorber further comprises an outer shell (10) circumscribing the working cylinder (14) and defining therebetween the reservoir (18), second valve means (16) located at an end of the working cylinder (14) defining an extremity of the lower working chamber (56) and allowing controlled two-way flow between the lower working chamber (56) and the reservoir (18), the solenoid valve means (62) being located in an independant passage (36,38; 403) between the upper working chamber (44) and the reservoir (18).

6. A shock absorber as claimed in claim 5, characterized in that the passage (36,38) comprises two telescopingly arranged tubes (36,38) extending through an axial passage (46) in the piston rod assembly (24).

7. A shock absorber as claimed in claim 5, characterized in that the passage (403) comprises a tube (403) one end of which is mounted on the second valve means (16) and the other end of which is slideably received in an axial passage (46) in the piston rod assembly (24).

8. A shock absorber as claimed in claim 7, characterized in that the solenoid valve means (62) is located in a chamber (407) formed in an extension of the outer shell (10) defined on a side of the valve means (16) opposite the lower working chamber (56), the chamber (407) being in fluid communication with the reservoir (18).

9. A shock absorber as claimed in claim 5, characterized in that the solenoid valve means (62) is mounted on the outer shell (10) between two ends thereof and extends through the outer shell (10) and the working cylinder (14) into the upper working chamber (44).

10. A shock absorber as claimed in claim 1, characterized in that the solenoid valve means (62,733) comprises a tubular valve member (80) mounted in a bore (82) formed in the core member (68), the valve member having a chamfered surface (100) thereon which cooperates with an opening (102) formed in the core member (68) to form the said variable orifice.

11. A shock absorber as claimed in claim 1, characterized in that the solenoid valve means (62,733) comprises a tubular valve member (80) mounted in a bore (82) formed in the core member (68), the core member (68) having an opening (102) therein which is defined in part by a chamfered surface (116), the valve member (80) having an edge (112) which cooperates with the chamfered surface (116) to form the variable orifice.

12. A shock absorber as claimed in claim 10, characterized in that the core member (903) is generally cylindrical and the valve member (901) is tubular and is slideably mounted on the core member (903).

13. A variable rate shock-absorber of the type having an enclosed working cylinder (14), an outer shell (10) circumscribing the working cylinder (14) and one end (15) thereof to form a fluid reservoir (18), a piston member (48) disposed in the working cylinder (14) and dividing the interior of the working cylinder (14) into an upper (44) and a lower working chamber (56), valve means (16) provided at the one end of the working cylinder (14) connecting the lower working chamber (56) with the reservoir (18), and a hollow piston rod (36) slidably received in the other end of the working cylinder (14), said piston rod (36) having one rod end (28) connected to the piston member (48) and the opposite rod end extending external to the working cylinder (14), the variable rate shock-absorber further comprising a cylindrical part (38) disposed in said working cylinder (14) having one part end in fluid communication with the reservoir (18) and the other part end slidably received in the interior of said hollow piston rod (36); and solenoid valve means (62) disposed in the hollow piston rod (36) and connected to the other part end of said cylindrical part (38), said solenoid valve means (62) having an inlet passage (102) in fluid communication with said upper working chamber (44), an outlet (96) in fluid communication with the reservoir (18) through the interior of said cylindrical part (38), said solenoid valve means (62) responsive to an electrical input signal to switch between a closed state inhibiting a fluid flow between said inlet passage (102) and outlet (96), and an open state enabling a fluid flow between said inlet passage (102) and outlet (96) and characterized in that the solenoid valve means comprises a valve member (80) slideably mounted in a bore (82) formed in a core member (68) defined between the hollow piston rod (36) and the upper working chamber (44) and slideable in response to actuation of the solenoid valve (62) to progressively open a variable orifice (100; 116) between a fully closed and a fully open position.

* * * * *